(12) United States Patent
Schmidt

(10) Patent No.: US 7,260,424 B2
(45) Date of Patent: Aug. 21, 2007

(54) DYNAMICALLY CONFIGURED ANTENNA FOR MULTIPLE FREQUENCIES AND BANDWIDTHS

(76) Inventor: Dominik J. Schmidt, 580 Arastradero Rd., Palo Alto, CA (US) 94306

( * ) Notice: Subject to any disclaimer, the term of this patent is extended or adjusted under 35 U.S.C. 154(b) by 1078 days.

(21) Appl. No.: 10/155,485

(22) Filed: May 24, 2002

(65) Prior Publication Data

US 2003/0219035 A1 Nov. 27, 2003

(51) Int. Cl.
*H04Q 7/32* (2006.01)
(52) U.S. Cl. .............. 455/575.7; 455/575.1; 455/550.1; 455/552.1; 455/73; 455/90.3; 343/700; 343/702; 343/751; 379/433.01; 379/428.01; 379/429
(58) Field of Classification Search ............ 455/575.7, 455/552.1, 550.1, 553.1, 575.1, 422.1, 403, 455/73, 78, 83, 500, 517, 90.1, 90.2, 90.3, 455/88; 343/702, 703, 751, 700, 895; 379/433.01, 379/428.01, 429
See application file for complete search history.

(56) References Cited

U.S. PATENT DOCUMENTS

| | | | | |
|---|---|---|---|---|
| 3,939,422 A | * | 2/1976 | Deise | 375/304 |
| 5,701,595 A | * | 12/1997 | Green, Jr. | 455/83 |
| 6,643,522 B1 | * | 11/2003 | Young | 455/552.1 |
| 6,912,406 B2 | * | 6/2005 | Lahlum et al. | 455/553.1 |
| 2002/0142796 A1 | * | 10/2002 | Sutton et al. | 455/553 |
| 2003/0098812 A1 | * | 5/2003 | Ying et al. | 343/702 |

* cited by examiner

*Primary Examiner*—Keith Ferguson

(57) ABSTRACT

A wireless communication device includes a reconfigurable antenna and one or more wireless transceivers coupled to the antenna. The reconfigurable antenna can be dynamically configured to transmit and receive wireless signals at a plurality of frequencies and bandwidths. A processor core is coupled to the reconfigurable antenna and the wireless transceivers. The processor core dynamically controls the configurations of the reconfigurable antenna and processes the wireless signals transmitted and received at the plurality of frequencies.

16 Claims, 8 Drawing Sheets

DYNAMICALLY CONFIGURED ANTENNA FOR MULTIPLE FREQUENCIES AND BANDWIDTHS

TECHNICAL FIELD

The present invention relates to a wireless communication device that is capable of receiving and transmitting wireless signals at a wide range of frequencies for different wireless communication protocols.

BACKGROUND

As communication technology advances, more methods of communication become available to consumers. Miniaturization of electronic components and a concomitant reduction in cost have enabled a large number of consumers to afford cutting-edge telecommunication technology, for example, cellular telephones. Continuing the relentless drive to improve transmission speed and reception quality, a number of cellular telephone protocols and short-range wireless communication protocols have emerged.

One issue facing the wireless communications is that different wireless protocols require different frequencies and bandwidths. For example, the PDC system in Japan operates at 800 MHz and has a bandwidth of only 30 kHz, whereas 802.11 a operates at 5.4 GHz with a 20 MHz bandwidth. There are thus nearly a factor of ten in the range of common operating frequencies and a factor of thousand in the range of operating bandwidths. There is therefore a need for a small and inexpensive wireless communication device that can operate at wide ranges of operating frequencies and operating bandwidths.

Microstrip antennas, however, are not suitable for wireless communications in such wide operating frequencies and operating bandwidths. Typical microstrip antennas suffer from several drawbacks: first, they only operate at a single frequency. Second, they have relatively narrow bandwidth. Third, they do not have good gain performance. It is known that multi-band antennas can simultaneously serve as antennas for AM/FM broadcast radio and for Citizen Band transceivers. As discussed in USPN U.S. Pat. No. 6,107,972 to Seward, et al., one problem in designing antennas of this type is to define an antenna that has near optimal receiving/transmission capabilities in several separate frequency bands. The AM radio band falls in the comparatively low frequency range of 550 to 1600 KHz while FM radio operates in the 88 to 108 MHz range and CB operates in the relatively narrow range of 26.95 to 27.405 MHz. Cellular telephone operates in a frequency band of 825 to 890 MHz. Basic antenna design principles dictate that a commonly used electrical length for a rod antenna used with a ground plane is one-quarter of the wavelength of the transmitted signal. Thus, there is a design conflict when a single antenna is used for several frequency ranges. One option used in prior art antenna design is to tune the antenna to the separate frequencies when switching between bands. This has obvious disadvantages to the user of the radio, using impedance matching networks. Another option is to design an antenna that provides a compromise and is usable in several frequency bands. Such an antenna, by its nature, provides near optimal reception in at most one frequency range. For example, it is not uncommon in automobile antennas to use an antenna length equivalent to one-quarter wavelength to the midpoint of the FM range. As a consequence, the lower frequency AM reception is not optimum but is acceptable. However, such an antenna is unacceptable for use with a cellular or CB transceiver. In vehicles, it is common to use one antenna for CB, another for AM/FM, and a third for cellular telephone.

A major challenge for all wireless devices communicating in different operating frequencies and bandwidths is to control the manufacturing cost and the device size. Ideally, the antenna should be manufactured at lower than one dollar in cost for portable devices. If multiple antennas are required for different bands, it would be difficult to meet this cost goal or to fit all the antennas on a single Network Interface Card or a Compact Flash Card.

SUMMARY

An object of the present invention is to provide an inexpensive and compact reconfigurable antenna that can operate at a wide range of frequencies for different communication protocols.

Another object of the present invention is to provide wireless communication device that can receive and transmit wireless signals, and process the wireless signals at different frequencies.

A further object of the present invention is to provide a portable device that can communicate wirelessly at different frequencies.

These objects are achieved by a wireless communication device, comprising:

a) a reconfigurable antenna that can be dynamically configured to transmit and receive wireless signals at a plurality of frequencies and bandwidths;

b) one or more wireless transceivers coupled to the antenna; and c) a processor core coupled to the reconfigurable antenna and the wireless transceivers, for dynamically controlling the configurations of the reconfigurable antenna and processing the wireless signals transmitted and received at the plurality of frequencies.

An advantage of the present invention is that the reconfigurable antenna and the associated processor allow seamless wireless communication at different frequencies and different communication protocols. The switching between different communication protocols is seamless and convenient to the users.

Another advantage of the present invention is that the reconfigurable antenna can be fabricated on printed circuit board so that it can be manufactured at low cost and it is compact in size. This is advantageous compared to a plurality of antennas with each dedicated to a different frequency band and a different communication protocol. This also allows the miniaturization of the wireless portable devices such as cellular telephones and PDAs.

A further advantage of the present invention is that the reconfigurable antenna uses a combination of active and passive antennas to maximize the operating frequency range. Furthermore, the low-loss switches are shared with diversity switches and transceiver switches that already exist in common antenna. In addition, the low-loss switches can control a plurality of conductive lines between antenna bodies. The number of switches is thus minimized; cost and size are reduced.

Yet another advantage of the present invention is the broadening of the bandwidth at a resonance frequency, which is achieved by adding both a capacitive load and an inductive load to the reconfigurable antenna.

A further advantage of the present invention is that the reception and transmission of the wireless signals are designed using active and passive antennas so that crosstalk is reduced between different frequency bands.

DRAWING DESCRIPTIONS

FIG. 1A is a block diagram of a wireless communication device in accordance with the present invention. The wireless communication device is fabricated as integrated circuit on a single semiconductor substrate. The wireless communication device includes a reconfigurable antenna that can be dynamically configured to transmit and receive wireless signals at a plurality of frequencies.

FIG. 1B is a detailed diagram of the switches in the reconfigurable antenna of FIG. 1A.

FIG. 2 is an exploded perspective of an implementation of the reconfigurable antenna of FIG. 1A. The reconfigurable antenna is fabricated on two substrates separated by a ground plane. The reconfigurable antenna includes an active portion that can be dynamically controlled to tune in to the plurality of frequencies, and a passive portion that are dedicated to resonate at one or more fixed frequencies.

DETAILED DESCRIPTION

Reference will now be made in detail to the preferred embodiments of the invention, examples of which are illustrated in the accompanying drawings. While the invention will be described in conjunction with the preferred embodiments, it will be understood that they are not intended to limit the invention to these embodiments. On the contrary, the invention is intended to cover alternatives, modifications and equivalents, which may be included within the spirit and scope of the invention as defined by the appended claims. Furthermore, in the following detailed description of the present invention, numerous specific details are set forth in order to provide a thorough understanding of the present invention. However, it will be obvious to one of ordinary skill in the art that the present invention may be practiced without these specific details. In other instances, well known methods, procedures, components, and circuits have not been described in detail as not to unnecessarily obscure aspects of the present invention.

Figure 1A:
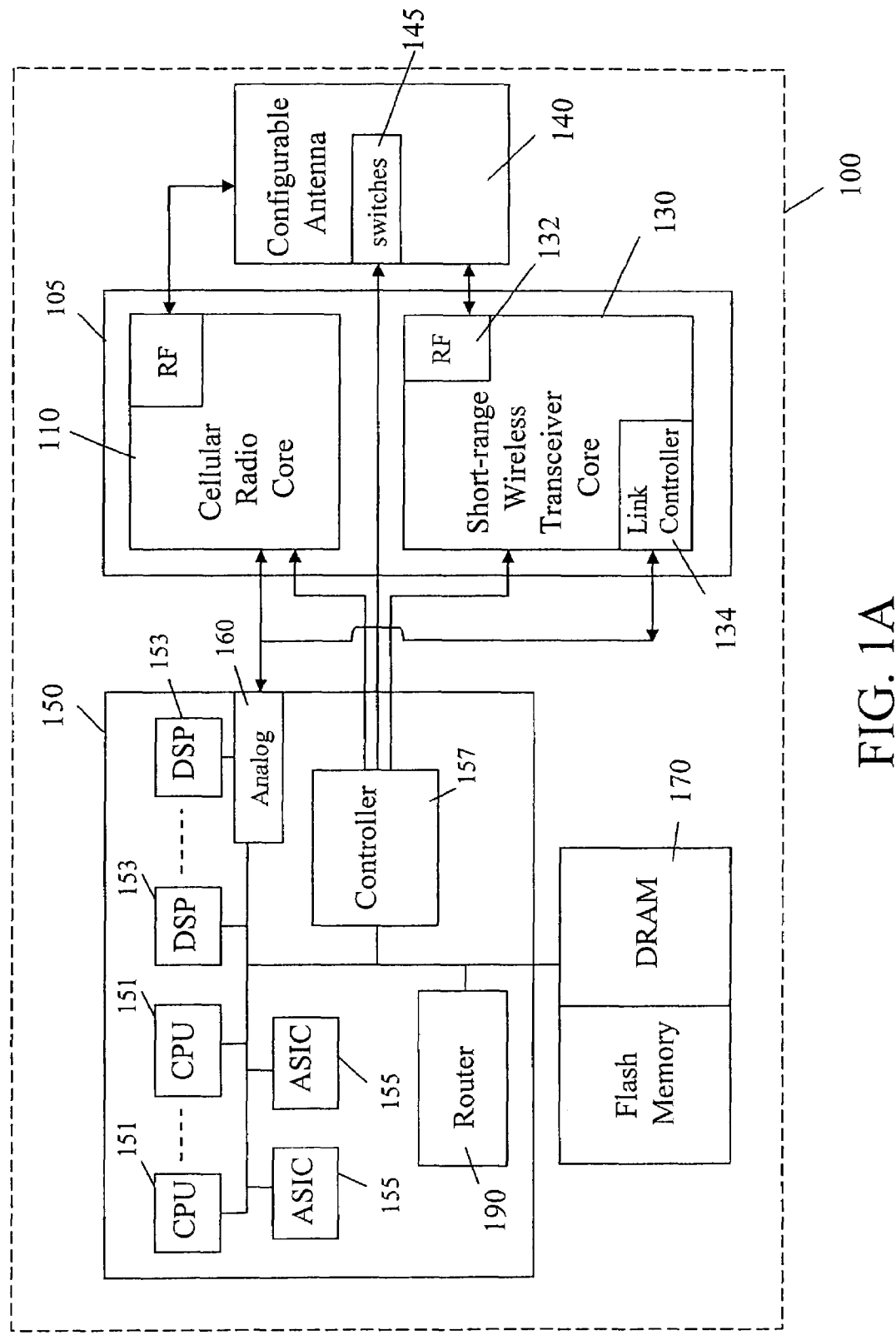

FIG. 1A shows a block diagram of a wireless communication device 100 in accordance with the present invention. In one implementation, the wireless communication device 100 is an integrated CMOS device with radio frequency (RF) circuits, including wireless transceivers 105, a processor core 150 including a baseband processor, and a memory system 170. The processor core 150 can be fabricated on a single semiconductor substrate or chip. The reconfigurable antenna 140, as described below, can be dynamically configured by controlling the states of the switches 145 the to transmit and receive wireless signals at different band frequencies. The memory system 170 can be a high-density memory array comprising various memory technologies such as flash memory and dynamic random access memory (DRAM), among others, on different portions of the memory array core. The memory system 170 can also be fabricated on the same semiconductor substrate as the processor core 150. In one implementation of the present invention, the wireless transceivers 105 include a cellular radio core 110 and a short-range wireless transceiver core 130.

The processor core 150 can include one or more central processor units (CPU) 151 such as MIPS processors, one or more digital signal processors (DSPs) 153, and a router 180, among others. These processors 151 and 153 can be configured to operate optimally on specific problems. For example, the bank of DSPs 153 can be optimized to handle discrete cosine transforms (DCTs) or Viterbi encodings, among others. Additionally, Application Specific Integrated Circuits (ASICs) 155 can be provided to handle specific algorithms in silicon more efficiently than the programmable processors 151 and 153. The number of active processors is controlled depending on the application, so that power is not used when it is not needed. This embodiment does not rely on complex clock control methods to conserve power, since the individual clocks are not run at high speed, but rather the unused processor is simply turned off when not needed.

In accordance with the present invention, the processor core 150 includes a controller 157 that can dynamically control the reconfigurable antenna 140 to enable it to transmit and receive wireless signals at different frequencies. Specifically, the controller 157 controls the open/close states of the switches 145 in the reconfigurable antenna 140 so that it resonates at the interest frequencies and filters out noises or other frequencies. The switches 145 can include micro-electro-mechanical (MEM) switches (described below in relation to FIGS. 2, 3, 5A and 5B).

Figure 1B:
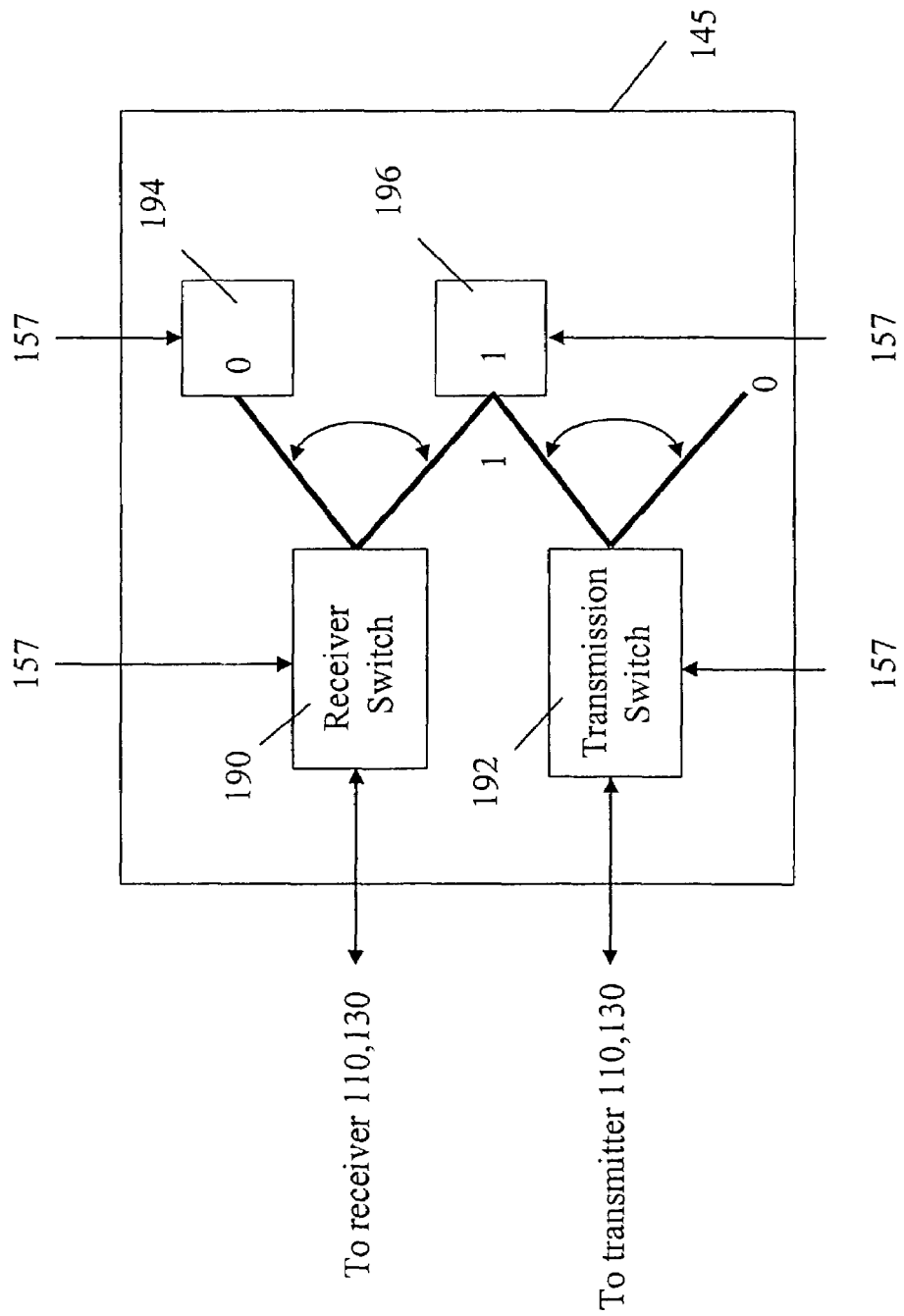

FIG. 1B illustrates details of one implementation of the switches 145. The switches 145 include low-loss switches 194,196 as well as receiver switch 190 and transmission switch 192. The receiver switch 190 and transmission switch 192 are already present in the common antennas. The low loss switches are also referred as diversity switches; they allow the device to receive from different spatial antenna configurations, improving noise characteristics. The receiver switch 190, transmission switch 192 and low-loss switches 194,196 are controlled by the controller 157. In accordance with the present invention, the switching between different wireless frequencies can be realized by configuring a combination of diversity switches and low-loss switches. The multiple uses of the pre-existing diversity switches reduce the cost and the size of the reconfigurable antenna.

The processor core 150 also includes an analog circuit 160 for receiving the analog signals from the transceiver 105 and convert them into digital signals, as well as for converting digital signals to analog signals to be output to the transceiver 105 for transmission.

One exemplary processor embedded in the processor core 150 includes a register bank, a multiplier, a barrel shifter, an arithmetic logic unit (ALU) and a write data register. The exemplary processor can handle DSP functions by having a multiply-accumulate (MAC) unit in parallel with the ALU. Embodiments of the processor can rapidly execute multiply-accumulate (MAC) and add-compare-subtract (ACS) instructions in either scalar or vector mode. Other parts of the exemplary processor include an instruction pipeline, a multiplexer, one or more instruction decoders, and a read data register. A program counter (PC) register addresses the memory system 170. A program counter controller serves to increment the program counter value within the program counter register as each instruction is executed and a new instruction must be fetched for the instruction pipeline. Also, when a branch instruction is executed, the target address of the branch instruction is loaded into the program counter by the program counter controller. The processor core 150 incorporates data pathways between the various functional units. The lines of the data pathways may be synchronously used for writing information into the core 150, or for reading information from the core 150. Strobe lines can be used for this purpose.

In operation, instructions within the instruction pipeline are decoded by one or more of the instruction decoders to produce various core control signals that are passed to the different functional elements of the processor core 150. In response to these core control signals, the different portions of the processor core conduct processing operations, such as multiplication, addition, subtraction and logical operations. The register bank includes a current programming status register (CPSR) and a saved programming status register (SPSR). The current programming status register holds various condition and status flags for the processor core 150. These flags may include processing mode flags (e.g. system mode, user mode, memory abort mode, etc.) as well as flags indicating the occurrence of zero results in arithmetic operations, carries and the like.

Through the router 180, the wireless communication device 100 can detect and communicate with any wireless system it encounters at a given frequency. The router 180 performs the switch in real-time through an engine that keeps track of the addresses of where the packets are going. The router 180 can send packets in parallel through two or more separate pathways. For example, if a Bluetooth™ connection is established, the router 180 knows which address it is looking at and will be able to immediately route packets using another connection standard. In doing this operation, the router 180 working with a digital sniffer program periodically scans its radio environment ('ping') to decide on optimal transmission medium. The router 180 can send some packets in parallel through both the primary and secondary communication channel to make sure some of the packets arrive at their destinations.

The processor core 150 controls the cellular radio core 110 and the short-range wireless transceiver core 130 to provide a seamless dual-mode network integrated circuit that operates with a plurality of distinct and unrelated communications standards and protocols such as Global System for Mobile Communications (GSM), General Packet Radio Service (GPRS), Enhance Data Rates for GSM Evolution (Edge) and Bluetooth™. The cellular radio core 110 provides wide area network (WAN) access, while the short-range wireless transceiver core 130 supports local area network (LAN) access. The processor core 150 has embedded read-only-memory (ROM) containing software such as IEEE802.11 (including IEEE802.11a, IEEE802.11b, IEEE802.11g, etc.), GSM, GPRS, Edge, and/or Bluetooth™ protocol software, among others.

In one embodiment, the cellular radio core 110 includes a transmitter/receiver section that is connected to the reconfigurable antenna 140. The transmitter/receiver section is a direct conversion radio that includes an I/Q demodulator, transmit/receive oscillator/clock generator, multi-band power amplifier (PA) and power control circuit, and voltage-controlled oscillators and synthesizers. In another embodiment of transmitter/receiver section 112, intermediate frequency (IF) stages are used. In this embodiment, during cellular reception, the transmitter/receiver section converts received signals into a first intermediate frequency (IF) by mixing the received signals with a synthesized local oscillator frequency and then translates the first IF signal to a second IF signal. The second IF signal is hard-limited and processed to extract an RSSI signal proportional to the logarithm of the amplitude of the second IF signal. The hard-limited IF signal is processed to extract numerical values related to the instantaneous signal phase, which are then combined with the RSSI signal.

For voice reception, the combined signals are processed by the processor core 150 to form PCM voice samples that are subsequently converted into an analog signal and provided to an external speaker or earphone. For data reception, the processor simply transfers the data over an input/output (I/O) port. During voice transmission, an off-chip microphone captures analog voice signals, digitizes the signal, and provides the digitized signal to the processor core 150. The processor core 150 codes the signal and reduces the bit-rate for transmission. The processor core 150 converts the reduced bit-rate signals to modulated signals such as I,I,Q,Q modulating signals, for example. During data transmission, the data is modulated and the modulated signals are then fed to the cellular telephone transmitter of the transmitter/receiver section.

Turning now to the short-range wireless transceiver core 130, the short-range wireless transceiver core 130 contains a radio frequency (RF) modem core 132 that communicates with a link controller core 134. The processor core 150 controls the link controller core 134. In one embodiment, the RF modem core 132 has a direct-conversion radio architecture with integrated VCO and frequency synthesizer. The RF modem core 132 includes an RF receiver connected to an analog-digital converter (ADC), which in turn is connected to a modem performing digital modulation, channel filtering, AFC, symbol timing recovery, and bit slicing operations. For transmission, the modem is connected to a digital to analog converter (DAC) that in turn drives an RF transmitter.

The link controller core 134 provides link control function and can be implemented in hardware or in firmware. One embodiment of the link controller core 134 is compliant with the Bluetooth™ specification and processes Bluetooth™ packet types. For header creation, the link controller core 134 performs a header error check, scrambles the header to randomize the data and to minimize DC bias, and performs forward error correction (FEC) encoding to reduce the chances of getting corrupted information. The payload is passed through a cyclic redundancy check (CRC), encrypted/scrambled and FEC-encoded. The FEC encoded data is then inserted into the header.

In one exemplary operating sequence, a user is in his or her office and browses a web site on a portable computer through a wired local area network cable such as an Ethernet cable. Then the user walks to a nearby cubicle. As the user disconnects, the wireless communication device 100 initiates a short-range connection using a Bluetooth™ connection. When the user drives from his or her office to an off-site meeting, the Bluetooth™ connection is replaced with cellular telephone connection. Thus, the wireless communication device 100 enables easy synchronization and mobility during a cordless connection, and open up possibilities for establishing quick, temporary (ad-hoc) connections with colleagues, friends, or office networks. Appliances using the wireless communication device 100 are easy to use since they can be set to automatically find and contact each other when within range.

When the wireless communication device 100 is in the cellular telephone connection mode, the short-range wireless transceiver core 130 is powered down to save power. Unused sections of the chip are also powered down to save power. Many other battery-power saving features are incorporated, and in particular, the cellular radio core 110 when in the standby mode can be powered down for most of the time and only wake up at predetermined instances to read messages transmitted by cellular telephone base stations in the radio's allocated paging time slot.

When the user arrives at the destination, according to one implementation, the cellular radio core 110 uses idle time between its waking periods to activate the short-range wireless transceiver core 130 to search for a Bluetooth™ channel signal. If Bluetooth™ signals are detected, the phone sends a de-registration message to the cellular system and/or a registration message to the Bluetooth™ system. Upon de-registration from the cellular system, the cellular radio core 110 is turned off or put into a deep sleep mode with periodic pinging and the short-range wireless transceiver core 130 and relevant parts of the synthesizer are powered up to listen to the Bluetooth™ channel.

According to one implementation, when the short-range wireless transceiver core 130 in the idle mode detects that Bluetooth™ signals have dropped in strength, the wireless communication device 100 activates the cellular radio core 110 to establish a cellular link, using information from the latest periodic ping. If a cellular connection is established and Bluetooth™ signals are weak, the wireless communication device 100 sends a de-registration message to the Bluetooth™ system and/or a registration message to the cellular system. Upon registration from the cellular system, the short-range wireless transceiver core 130 is turned off or put into a deep sleep mode and the cellular radio core 110 and relevant parts of the synthesizer are powered up to listen to the cellular channel.

The router 180 can send packets in parallel through the separate pathways of cellular or Bluetooth™. For example, if a Bluetooth™ connection is established, the router 180 knows which address it is looking at and will be able to immediately route packets using another connection standard. In doing this operation, the router 180 pings its environment to decide on optimal transmission medium. If the signal reception is poor for both pathways, the router 180 can send some packets in parallel through both the primary and secondary communication channel (cellular and/or Bluetooth™) to make sure some of the packets arrive at their destinations. However, if the signal strength is adequate, the router 180 prefers the Bluetooth™ mode to minimize the number of subscribers using the capacity-limited and more expensive cellular system at any give time. Only a small percentage of the wireless communication device 100, those that are temporarily outside the Bluetooth™ coverage, represents a potential load on the capacity of the cellular system, so that the number of mobile users can be many times greater than the capacity of the cellular system alone could support.

Figure 2:
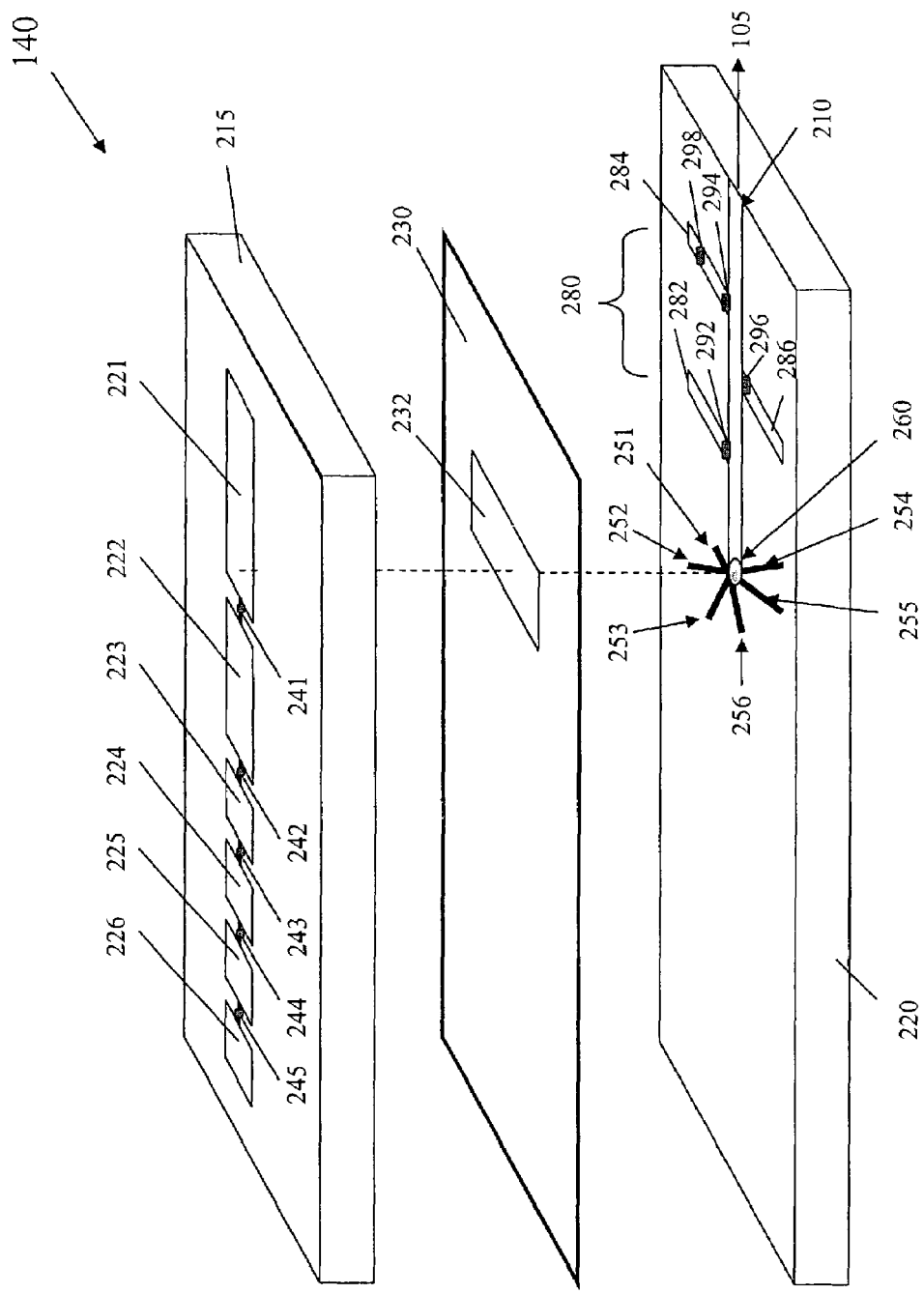

In accordance with the present invention, the reconfigurable antenna 140 includes an active portion that can be dynamically controlled to tune in to the plurality of frequencies, and a passive portion that is dedicated to resonate at fixed frequencies. FIG. 2 is an exploded perspective of an implementation of the reconfigurable antenna 140 of FIG. 1A. The reconfigurable antenna 140 is fabricated on a first substrate 215 and a second substrate 220 separated by a conducting layer (a ground plane 230). The first substrate 215 includes multiple antenna bodies and multiple poles that can be dynamically configured to resonate at a multiple of frequencies compatible with different communication protocols. The frequency ranges are preferably (but not limited to) centered at 900 MHz, 1570 MHz, 1800 MHz, 1900 MHz, 2400 MHz, and 5700 MHz. The second substrate 220 includes frequency matching stubs, which resonate at fixed frequencies (i.e. the passive portion of the reconfigurable antenna). The second substrate 220 also includes a configurable filter 280 that can be actively configured to filter out noises from unwanted frequencies.

A transmission line 210 is printed on a first substrate 215. A main antenna body 221 and a series of secondary antenna bodies 222–226 are printed on a separate second substrate 220. A common ground plane 230 is located between the two substrates. Communication signals pass between the transmission line 210 and the main antenna body 221 through an aperture 232 in the ground plane 230. The ground plane 230 shields the radiating energy from the transmission line 210 so that it will not couple into the main antenna body 221 and the secondary antenna bodies 222–226.

In an implementation of the present invention, the switches 145 include low-loss switches 241–245 that connect the main antenna body 221 and the secondary antenna bodies 222–226. The reconfigurable antenna 140 can be dynamically configured to resonate at different frequencies by selectively opening or closing low-loss switches 241–245. When the low-loss switch 241 is open, the main antenna body 221 is electrically isolated from all the secondary antenna bodies 222–226. The effective antenna length of the reconfigurable antenna 140 is the length of the main antenna body 221. In the preferred embodiment, the length of the main antenna body 221 is chosen to be half wavelength at 5700 MHz, which allows the wireless signals at 5700 MHz to resonant in the main antenna body 221.

When the low-loss switch 241 is closed and the low-loss switches 242–245 are open, the main antenna body 221 and the secondary antenna body 222 are electrically connected, but they are isolated from the rest of the secondary antenna bodies 223–226. The effective antenna length of the reconfigurable antenna 140 is then the length of the main antenna body 221 plus the length of the secondary antenna body 222, which corresponds to half wavelength at 2400 MHz. The electrically connected main antenna body 221 and the secondary-antenna body 222 have their resonant frequency at 2400 MHz.

Figure 5A:
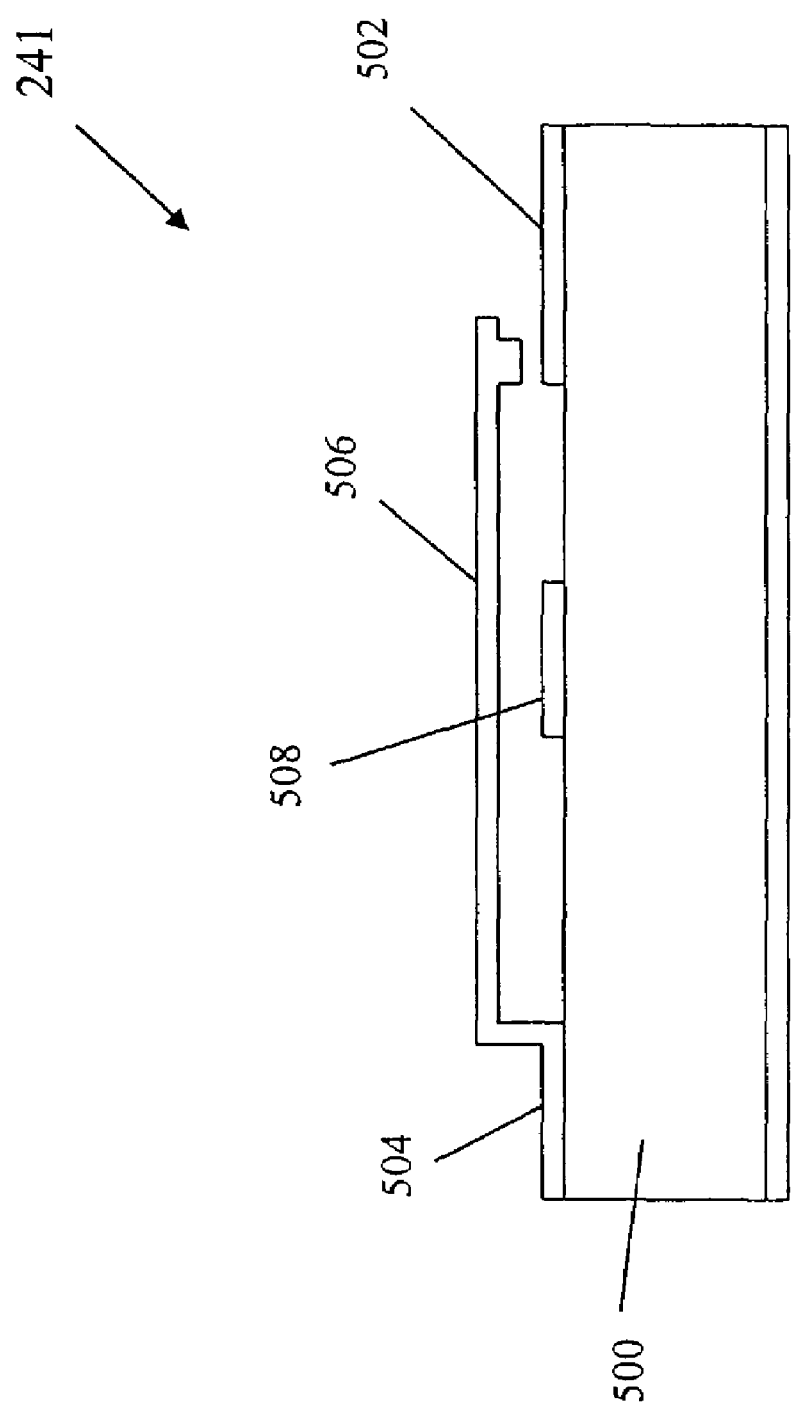
FIG. 5A illustrates a side view of a low-loss switch in an open position.
Figure 5B:
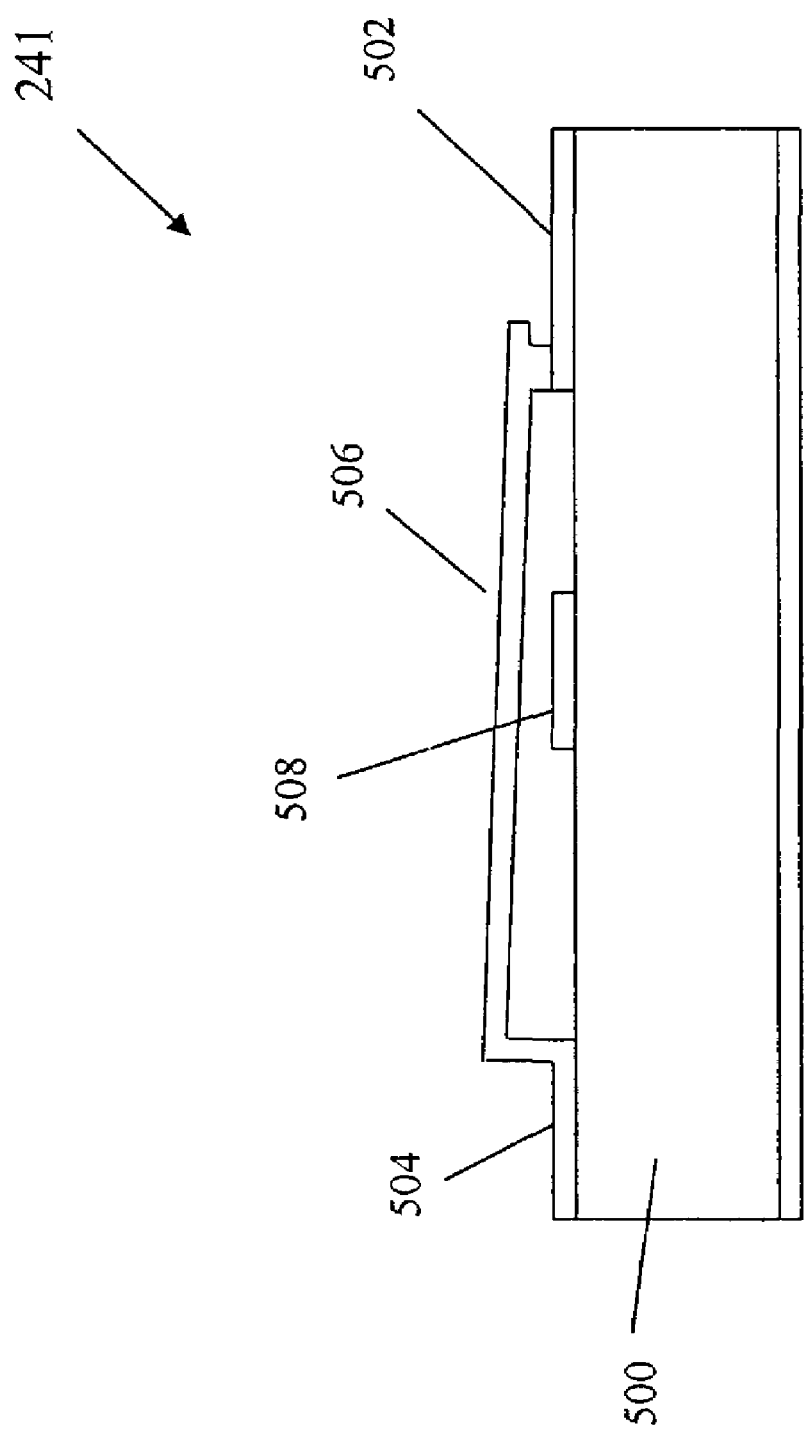
FIG. 5B illustrates a side view of a low-loss switch in a close position.

In accordance with the present invention, the low-loss switches are preferably micro-electro-mechanical (MEM) switches, as illustrated in FIGS. 5A and 5B below. MEM switches have a very low insertion loss when closed and a high isolation value when open. Other types low-loss switches include p-HEMT (High Electron Mobility Transistor) switches such as gallium arsenide semiconductor switches.

Table 1 summarizes the configurations of the low-loss switches 241–245 at each of the resonant frequencies of the reconfigurable antenna 140 at 900 MHz, 1570 MHz, 1800 MHz, 1900 MHz, 2400 MHz, and 5700 MHz. The effective length of the antenna body in each configuration corresponds to half wavelength at the corresponding frequency. The open and close states of the low-loss switches 241–245 are dynamically controlled by the controller 157 as instructed by the processor core 150 so that the resonance frequency of the reconfigurable antenna 140 is always tuned to match the frequency mode of the wireless communication device 100.

TABLE 1

Low-loss Switch Configurations for Tuning Different Antenna Frequencies

| | Low-loss Switch 241 | Low-loss Switch 242 | Low-loss Switch 243 | Low-loss Switch 244 | Low-loss Switch 245 |
|---|---|---|---|---|---|
| 5700 MHz | Open | Open | Open | Open | Open |
| 2400 MHz | Closed | Open | Open | Open | Open |
| 1900 MHz | Closed | Closed | Open | Open | Open |
| 1800 MHz | Closed | Closed | Closed | Open | Open |
| 1570 MHz | Closed | Closed | Closed | Closed | Open |
| 900 MHz | Closed | Closed | Closed | Closed | Closed |

The transmission line 210 is terminated by frequency matching stubs 251,252,253,254,255,256 that join the transmission line 210 at a stub junction 260. The frequency matching stubs 251–256 respectively corresponding to 900 MHz, 1570 MHz, 1800 MHz, 1900 MHz, 2400 MHz, and 5700 MHz. Each of frequency matching stubs 251–256 is designed so that their lengths are respectively one-quarter wavelengths of their corresponding frequencies. For example, the frequency-matching stub 251 has a length of one-quarter of the wavelength at 5700 MHz. The frequency-matching stub 256 has the length of one-quarter wavelength at 900 MHz.

A frequency-matching stub generates a short circuit at the entrance to the stub when a signal having a wavelength four times the stub length passes through the stub. For example, when a signal at 1900 MHz passes through the transmission line 210 and the frequency matching stub 253, the frequency matching stub 253 creates a short circuit at the stub junction 260, which allows maximum power flow between the transmission line 210 and the main antenna body 221.

To reduce the RF coupling between-the frequency matching stubs 251–256, it is desirable to keep the angle between the matching stubs 251–256 as large as possible. The large angular separation also minimizes the size of the stub junction 260. The finite size of the stub junction 260 produces non-ideal impedances to the reconfigurable antenna 140. The lengths of the frequency-matching stub 251–256 need to be adjusted from the ideal one-quarter wavelength to correct for these non-ideal factors. It is also desirable to keep the frequency matching stubs 251–256 as far away from the transmission line 210 as possible to avoid any RF coupling between the stubs 28 and 30 and the transmission line 210. In the preferred embodiment of FIG. 2, each of the frequency matching stubs 251–256 is approximately 52 degrees away from the neighboring stub and the transmission line 210.

One advantage of the present invention is the wide frequency range that can be covered by the reconfigurable antenna 140. The effective antenna length is dynamically configured to tune in a large dynamic range by switching the low-loss switches 241–245. In addition, the reconfigurable antenna 140 includes a combination of active and passive antennas. The passive antenna provides sharp resonance peaks in the rejection ratio at a subset of interested frequencies, while the dynamic antenna provides capability of changing tuning frequency to a drastically different frequency. The combination of active and passive antennas further broadens the range of the resonance frequencies. The reconfigurable antenna 140 can therefore be tuned into-wireless communication bands at drastic different frequencies. The different frequency bands in the example of Table 1 different by at least ten percent or larger in percentage of the number of cycles per second at each frequency.

The length for the aperture 232 is designed to maximize antenna performance. For a multiple-frequency reconfigurable antenna 140 as shown in FIG. 2, the aperture 232 is chosen to be equal to one-half of the wavelength of the highest frequency, that is, 5700 MHz in the particular implementation described herein. The one-half of a wavelength is optimal for maximum power transfer at 5700 MHz. Furthermore, the shortest wavelength is chosen to prevent higher order modes from appearing on any shorter wavelength signals. The aperture 232 having one-half of the wavelength at 5700 MHz is too short to allow a full half-wavelength of the longer wavelength signals (at 900 MHz, 1570 MHz, 1800 MHz, 1900 MHz, and 2400 MHz) to appear in the aperture 232. This causes the aperture 232 to have an inductive component at longer wavelengths, which reduces the energy transfer to the transmission line 210 at longer wavelengths. Such inductive effect of the aperture 232 can be compensated by shortening the frequency-matching stub 252–256 to less than one-quarter wavelength. The stub lengths could be reduced enough to allow the capacitive components of the frequency matching stubs 252–256 to resonate out the inductive component of the aperture 232.

In accordance with the present invention, the reconfigurable antenna 140 can be fabricated using printed circuit technology. The transmission line 210 and the frequency matching stubs 251–256 may be printed directly onto a circuit board that serves as the first substrate 215. The main antenna body 221 and the secondary antenna bodies 222–226 may be printed onto a second circuit board that will serve as the second substrate 220. The low-loss switches 241–245 can be fabricated on a semiconductor wafer and die cut, inserted onto the printed circuit board serving as the second substrate 220. The ground plane 230 may be printed on either circuit board. A low loss adhesive is used to bond the first substrate 215 and the second substrate 220 together.

In accordance to the present invention, the coupling between different frequency bands (i.e. cross talk) can be reduced further by a configurable filter 280 printed on the second substrate 220 (FIG. 2). Signals received by the antenna bodies 221–226 are coupled into the stub junction 260. The signals then pass through the transmission line 210 and output to the amplifier in the wireless transceivers 105. The impedance of the filter 280 is a function of the frequency of the signal passing through the transmission line 210. The configurable filter 280 reduces the magnitude of the signals at some frequencies while allowing other frequency signals to pass relatively unimpeded. Filter stubs 282,284,286 are connected to the transmission line 210 at a stub injunctions by low-loss switches 292,294,296 (included the group of switches 145). When the Low-loss switches 292,294,296 are opened under the control of controller 157, the transmission line 210 is electrically isolated from the filter stubs 282,284,286. The only impedance affecting the signal is the impedance of the transmission line 210. This impedance is determined primarily by the geometry of the transmission line 210 and the frequency of the signal. When the low-loss switch 292 is closed by the controller 157, the filter stub 282 is electrically connected to the transmission line 210. The filter stub 282 is then in parallel with the section of the transmission line 210 that follows. The impedance of the filter stub 282 will be, therefore, in parallel with the impedance of the transmission line 210 that follows the stub junction of the filter stub 282. This will alter the impedance of the configurable filter 280 as seen by a signal entering the transmission line 210, causing the configurable filter 280 to pass and/or block different frequencies. The low-loss switches can also be located inside of the filter stubs 282,284,286. A filter stub can also have more than one low-loss switch. For example, two low-loss switches 294, 298 provide two electric conductive lengths of filter stub 284. The filter stub 284 has a short conductive length when the low-loss switch 294 is closed while low-loss switch 298 is open, and a longer stub length when both low-loss switches 294,298 are closed. By designing the locations of the filter stubs, the number and the locations of the low-loss switches 292,294,296,298 as well as the geometries of the filter stubs 282,284,286 and transmission line 210, different frequencies can be impeded or while the others unimpeded at different low-loss switch configurations. The different of close/open states of the low-loss switches 292–298 result in a plurality of filter configurations, each of which allows one of the signal frequency 900 MHz, 1570 MHz, 1800 MHz, 1900 MHz, 2400 MHz, and 5700 MHz to pass relatively unimpeded while the other frequencies blocked. This resulted in a reduction of unwanted signals from different frequency bands when the reconfigurable antenna 140 is tuned into one frequency band.

In accordance with the present invention, the switchings between different wireless communication bands can be made automatically and seamlessly to the users. The need for band (and/or protocol) switching can be caused a drop in signal strength in one protocol or mode. For example, if the short-range wireless transceiver core 130 in the idle mode detects that Bluetooth™ signals have dropped in strength. The wireless communication device 100 activates the cellular radio core 110 to establish a cellular link while the controller 157 dynamically controls the open and close states of the low-loss switches 241–245 and low-loss switches 292–298 so that the reconfigurable antenna 140 is tuned to the cellular frequency for the new connection. The cellular connection is established, the wireless communication device 100 deregisers from the Bluetooth™ system and registers to the cellular system. The signals from the Bluetooth™ system are now filtered out by the reconfigurable antenna 140.

Figure 3:
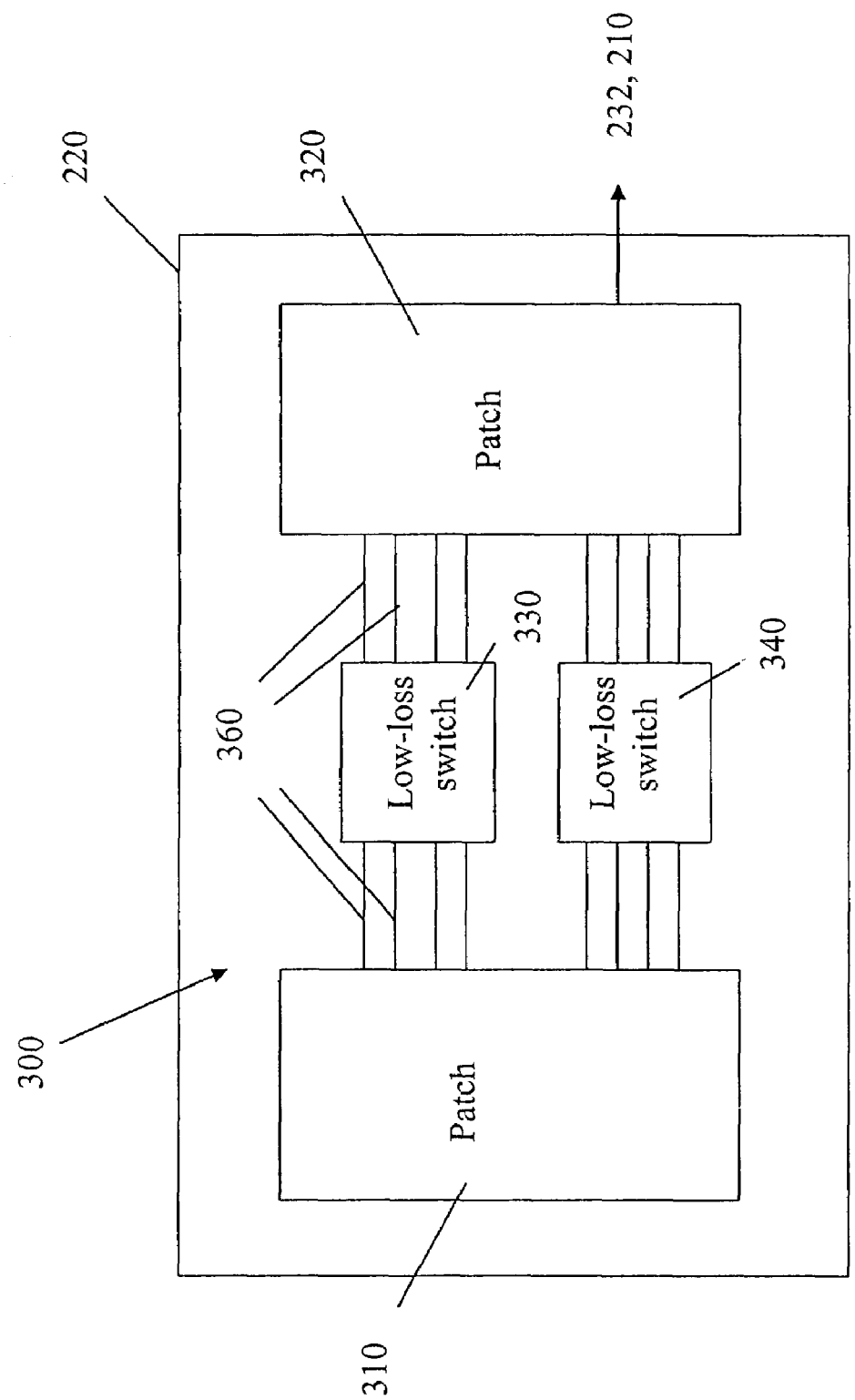
FIG. 3 shows another implementation of the active portion of the reconfigurable antenna in FIG. 2.

FIG. 3 shows another implementation of the active portion of the reconfigurable antenna 140 which is fabricated on the first substrate 215 of the reconfigurable antenna 140 (FIG. 2). The active antenna 300 includes two electrode patches 310 and 320 (or antenna bodies), a series of narrow conductive lines 360 that connect the electrode patches 310 and 320, and low-loss switches 330 and 340 that control the connections. The electrode patch 320 is fed to the aperture 232 in the ground plane 230 and the transmission line 210 on the second substrate 220. The electrode patches 310 and 320 and the narrow conductive lines 360 can be printed directly onto a circuit boards that serves as the first substrate 215. The low-loss switches 330 and 340 can be fabricated on a semiconductor wafer, die cut and inserted onto the printed circuit board. This design takes advantage of the fact that current in a shaped patch antenna typically flows in a laminar form in only one dimension. This means the current can be directed by the narrow conductive lines 360 between the electrode patches 310,320 without losing the desired radiation pattern. The narrow conductive lines result in a decrease in the resonance frequency due to increased inductance and decreased capacitance.

The compact design shown in FIG. 3 enables the miniaturization of the wireless device 100. A major problem faced by wireless systems is the antenna size. An efficient antenna typically requires a size larger than about ½ of the wavelength. For GSM at 800 MHz, this translates to about 20 cm, which is longer than the design constraints of the most of the wireless devices.

In accordance with the present invention, the low-loss switches are reused to low cost and reduce device dimensions as well as manufacture complexity. The low-loss switches 330,340 can be the diversity switch and transceiver/receiver switches that are already existence in the common antenna. Furthermore, the low-loss switches 330, 340 are shared among a plurality of narrow conductive lines 360, which reduces the number of components and thus cost. The design combines innovative geometries with sophisticated loading and switching schemes, re-using the same components that are already present on current wireless devices. This reconfigurable antenna in this design first tune to the neighborhood of a carrier frequency, and then follow the carrier frequency by adjusting antenna gain (versus adjusting frequency as in PLL). It would also enable the system to switch between high bandwidth WLAN systems and narrowband TDMA/GSM systems. The frequency tracking and band switching can be made real time with the baseband processor in the processor core 150 selecting antenna configurations based on signal strength and signal type. For example, in the case of a switch between 802.11b and GPRS, a dual-frequency antenna (900 MHz and 2.4 GHz) can operate at narrowband during one of the empty GPRS time slots. The processor core 150 examines the presence and the strength of the signals at the 2.4 GHz frequency in a narrowband mode. If the signals are present and strong enough, the whole antenna is switched to a wideband mode to allow for 802.11b proper demodulation.

In another embodiment of the present invention, the receiver is capable of tuning in a specific narrow-band frequency by slightly varying the antenna loading (thus the resonance frequency). The variable antenna loading can be implemented on the RF chip or the power amplifier, which can be controlled by the baseband chip (processor core 150). This is achieved by varying the capacitance of a variable capacitor mounted on the antenna or on the power amplifier with very low loss in the system. For example, this design is applicable to Global System for Mobile Communications (GSM) that receives and transmits frequencies in the ranges of 935–960 MHz and 890–915 MHz. The capability of narrowband selection can also be applied to aid in frequency hopping systems such as Bluetooth™. The carrier frequency hops 1600 times per second in Bluetooth™, with 1–2 MHz bandwidth per hop. The system bandwidth required is 70 MHz. The signal strengths in a frequency-hopping wireless mode are detected in a narrowband mode so that the antenna parameters can be adjustably optimized before each frequency hop. As a result, the signal-to-noise ratio of Bluetooth™ can be considerably.

Figure 4:
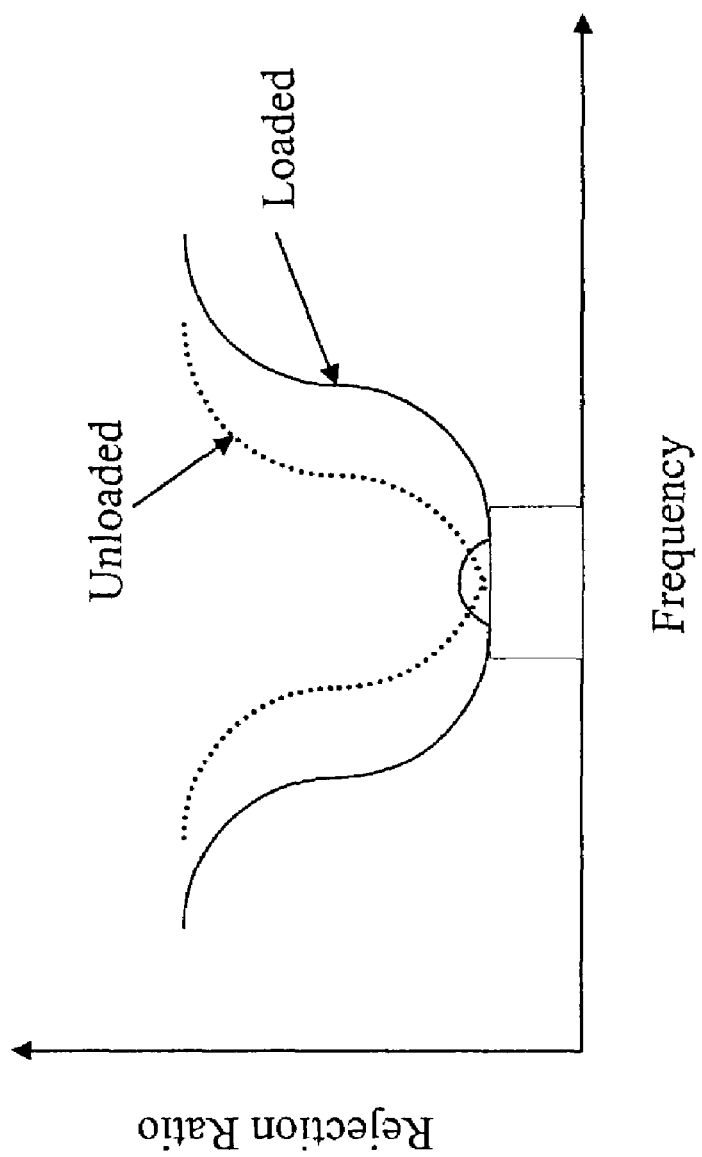
FIG. 4 illustrates the effect of broadening resonance frequencies by adding a capacitive load and an inductive load to the reconfigurable antenna.

FIG. 4 illustrates the effect of the broadening resonance frequencies by adding a capacitive load and an inductive load to the reconfigurable antenna. As shown, the rejection ratio in the unloaded antenna has a narrow negative resonance peak. Two additional resonance frequencies can be added above and below the unloaded resonance by adding a capacitive load and an inductive load to the antenna. The addition of the capacitive and inductive loads effectively increases the bandwidth by a factor of three.

In accordance with the present invention, the operating frequency ranges of the reconfigurable antenna 140 can be further broadened by being used in combination with raised patch antenna, PCB patch antenna, quarter wave movable antenna such as helical antenna, etc.

FIG. 5A and FIG. 5B respectively show the side views of the low-loss switch 241 in 'open' and 'close' positions. The low-loss switch 241 may be fabricated using standard integrated circuit technology. The low-loss switch 241 is constructed on a substrate 500. In the preferred embodiment, GaAs is used as the substrate 500. Other materials, such as InP, silicon, quartz, or even ceramics may also be used. On top of the substrate 500 is an input line 502, an output line 504, an armature 506, and a substrate electrode 508. The open position of low-loss switch 241, as shown in FIG. 5A, electrically separates the main antenna body 221 from the secondary antenna bodies 222–226 whereas a close potion, as shown in FIG. 5B, electrically connects the main antenna body 221 with the secondary antenna body 222. low-loss switches 242–245, 261–263 can also be similarly fabricated.

Figure 6:
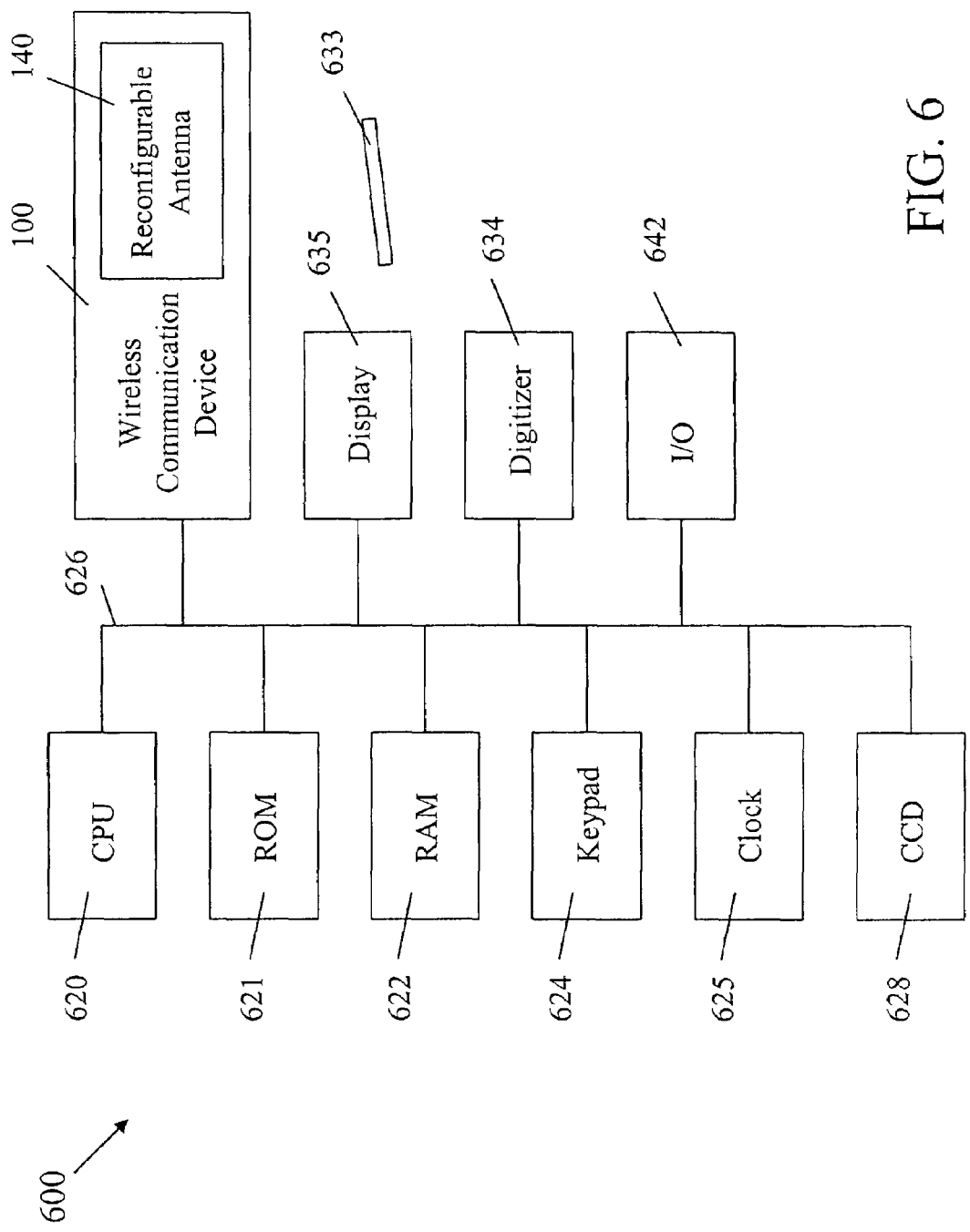
FIG. 6 is a block diagram of a portable computer system for providing data management support in accordance with the present invention.

FIG. 6 illustrates an exemplary portable computer system 600 equipped with the wireless communication device 100. The portable computer system 600 is preferably housed in a small, rectangular portable enclosure. A general-purpose architecture for entering information into the data management by writing or speaking to the computer system is illustrated. A computer processor 620 or central processing unit (CPU) provides the processing capability. The computer processor 620 can be a reduced instruction set computer (RISC) processor or a complex instruction set computer (CISC) processor. In one embodiment, the computer processor 620 is a low power CPU such as the MC68328V DragonBall device available from Motorola Inc.

The computer processor 620 is connected to a read-only-memory (ROM) 621 for receiving executable instructions as well as certain predefined data and variables. The computer processor 620 is also connected to a random access memory (RAM) 622 for storing various run-time variables and data arrays, among others. The RAM 622 is sufficient to store user application programs and data. In this instance, the RAM 622 can be provided with a back-up battery to prevent the loss of data even when the computer system is turned off. However, it is generally desirable to have some type of long term storage such as a commercially available miniature hard disk drive, or non-volatile memory such as a programmable ROM such as an electrically erasable programmable ROM, a flash ROM memory in addition to the ROM 621 for data back-up purposes. The portable computer system 600 has built-in applications stored in the ROM 621 or downloadable to the RAM 622 which include, among others, an appointment book to keep track of meetings and to-do lists, a phone book to store phone numbers and other contact information, a notepad for simple word processing applications, a world time clock which shows time around the world and city locations on a map, a database for storing user specific data, a stopwatch with an alarm clock and a countdown timer, a calculator for basic computations and financial computations, and a spreadsheet for more complex data modeling and analysis. Additionally, project planning tools, and CAD/CAM systems, Internet browsers, among others, may be added to increase the functionality of portable computing appliances. Users benefit from this software, as the software allows users to be more productive when they travel as well as when they are in their offices.

The portable computer system 600 receives instructions from the user via one or more switches such as push-button switches in a keypad 624. The computer processor 620 is also connected to a real-time clock/timer 625 that tracks time. The real-time clock/timer 625 can be a dedicated integrated circuit for tracking the real-time clock data, or alternatively, the real-time clock/timer 625 can be a software clock where time is tracked based on the clock signal clocking the computer processor 620. In the event that the real-time clock/timer 625 is software-based, it is preferred that the software clock/timer be interrupt driven to minimize the CPU loading. However, even an interrupt-driven software real-time clock/timer 625 requires certain CPU overhead in tracking time. Thus, the real-time clock/timer integrated circuit 625 is preferable where high processing performance is needed.

The computer processor 620 drives an internal bus 626. Through the bus 626, the computer system can access data from the ROM 621 or RAM 622, or can acquire I/O information such as visual information via a charged-coupled-device (CCD) sensor 628. The CCD sensor 628 is further connected to a lens assembly (not shown) for receiving and focusing light beams to the CCD sensor 628 for digitization. Images scanned via the CCD sensor 628 can be compressed and transmitted via a suitable network such as the Internet, through Bluetooth™ channel, cellular telephone channels or via facsimile to a remote site.

In accordance with the present invention, the computer processor 620 is connected to the wireless communication device 100 that embodies a reconfigurable antenna 140. The wireless communication device 100 satisfies the need to access electronic mail, paging, mode/facsimile, remote access to home computers and the Internet. Because the wireless communication device 100 can dynamically tune into a wide range of frequency bands at high fidelity, the portable computer system 600 can communicate with other device using a plurality of wireless protocols. One simple form of wireless communication device 100 is a wireless link to a cellular telephone where the user simply accesses a cellular channel similar to the making of a regular voice call. One channel is dedicated to voice calls because the latency and low packet reliability in data channels are not suitable for voice communications. In one implementation, GPRS provides 8 channels per user with one being dedicated to voice and independent of the data connection.

The computer processor 620 of the preferred embodiment accepts handwritings as an input medium from the user. A digitizer 634, a pen 633, and a display 635 are provided to capture the handwriting. Preferably, the digitizer 634 has a character input region and a numeral input region that are adapted to capture the user's handwritings on words and numbers, respectively. The display 635 has a viewing screen exposed along one of the planar sides of the enclosure are provided. The display can be a Liquid Crystal Display or (LCD) or Organic Light Emitting Diode (OLED) Display. The assembly combination of the digitizer 634, the pen 633 and the display 635 serves as an input/output device. When operating as an output device, the display 635 displays computer-generated images developed by the CPU 620. The display 635 also provides visual feedback to the user when one or more application software execute. When operating as an input device, the digitizer 634 senses the position of the tip of the stylus or pen 633 on the display 635 and provides this information to the computer processor 620. In addition to the vector information, the present invention contemplates that display assemblies capable of sensing the pressure of the stylus on the screen can be used to provide further information to the CPU 620.

The CPU 620 accepts pen strokes from the user using the stylus or pen 633 that is positioned over the digitizer 634. As the user "writes," the position of the pen 633 is sensed by the digitizer 634 via an electromagnetic field as the user writes information to the computer system. The digitizer 634 converts the position information to graphic data. For example, graphical images can be input into the pen-based computer by merely moving the stylus over the surface of the screen. As the CPU 620 senses the position and movement of the stylus, it generates a corresponding image on the screen to create the illusion that the pen or stylus is drawing the image directly upon the screen. The data on the position and movement of the stylus is also provided to handwriting recognition software, which is stored in the ROM 621 and/or the RAM 622. The handwriting recognizer suitably converts the written instructions from the user into text data suitable for saving time and expense information. The process of converting the pen strokes into equivalent characters and/or drawing vectors using the handwriting recognizer is described below.

The computer system is also connected to one or more input/output (I/O) ports 642 which allow the CPU 620 to communicate with other computers. Each of the I/O ports 642 may be a parallel port, a serial port, a universal serial bus (USB) port, a Firewire port, or alternatively a proprietary port to enable the computer system to dock with the host computer. In the event that the I/O port 642 is housed in a docking port, after docking, the I/O ports 642 and software located on a host computer (not shown) support an automatic synchronization of data between the computer system and the host computer. During operation, the synchronization software runs in the background mode on the host computer and listens for a synchronization request or command from the portable computer system 600 of the present invention. Changes made on the computer system and the host computer will be reflected on both systems after synchronization. Preferably, the synchronization software only synchronizes the portions of the files that have been modified to reduce the updating times. The I/O port 642 is preferably a high speed serial port such as an RS-232 port, a Universal Serial Bus, or a Fiber Channel for cost reasons, but can also be a parallel port for higher data transfer rate.

One or more portable computer systems 600 can be dispersed in nearby cell regions and communicate with a cellular mobile support station (MSS) as well as a Bluetooth™ station. The cellular and Bluetooth™ stations relay the messages via stations positioned on a global basis to ensure that the user is connected to the network, regardless of his or her reference to home. The stations are eventually connected to the Internet, which is a super-network, or a network of networks, interconnecting a number of computers together using predefined protocols to tell the computers how to locate and exchange data with one another. The primary elements of the Internet are host computers that are linked by a backbone telecommunications network and communicate using one or more protocols. The most fundamental of Internet protocols is called Transmission Control Protocol/Internet Protocol (TCP/IP), which is essentially an envelope where data resides. The TCP protocol tells computers what is in the packet, and the IP protocol tells computers where to send the packet. The IP transmits blocks of data called datagrams from sources to destinations throughout the Internet. As packets of information travel across the Internet, routers throughout the network check the addresses of data packages and determine the best route to send them to their destinations. Furthermore, packets of information are detoured around non-operative computers if necessary until the information finds its way to the proper destination.

The Web is based on a client/server model where Web pages reside on host computers that "serve up" pages when the user's computer (client computer) requests them. As the user "surfs" the Web, a browser can request data from the database on a server computer that processes and replies the desired data back to the computer system of FIG. 6 and to display that request when the request is fulfilled by the server. The client computer runs a browser software which asks for specific information by sending a HTTP request across the Internet 150 connection to the host computer. When the host computer receives the HTTP request, it responds by sending the data back to the client. The browser commonly features a graphical user interface with icons and menus across the top along with a field to supply the URL for retrieval purposes. Navigational buttons guide the users through cyberspace in a linear manner, either one page forward or backward at a time. Pull down menus provide a history of sites accessed so that the user can revisit previous pages. A stop button is typically provided to cancel the loading of a page. To preserve favorite sites, a bookmark is provided to hold the user's favorite URLs in a list such as a directory tree. Furthermore, the browser typically provides a temporary cache on the data storage device or in RAM. The cache allows a more efficient Internet access as it saves bandwidth and improves access performance significantly. The browser also interprets HyperText Markup Language (HTML) which allows web site creators to specify a display format accessible by HTML compatible browsers.

Typically, when the user types in the URL or clicks on a hyperlink, TCP/IP opens a connection between the host and client computers. The browser then generates a request header to ask for a specific HTML document. The server responds by sending the HTML document as text to the client via the TCP/IP pipeline. The client computer acknowledges receipt of the page and the connection is closed. The HTML document is stored in the browser's cache. The browser then parses the HTML document for text and tags. If the browser runs across tags that link to images/pictures and sounds, the browser makes separate requests for these files to the server and displays or generates sounds to the user. To supply more intelligent processing of information over the Internet, a language such as Java may be utilized. Java was developed originally by Sun Microsystems of Mountain View, Calif. The specification for the Java language is stored at the Java web site http://java.sun.com/. The web site contains the Java development software, a HotJava web browser, and on-line documentation for all aspects of the Java language, hereby incorporated by reference. Designed to be small, simple and portable across processor platforms and operating systems, Java can download and play applets on a browser system of the receiver, or reader. Applets are Java programs that are downloaded over the Internet World Wide Web, as dictated by a tag such as <applet> tags and executed by a Web browser on the reader's machine. In Java, the compiler takes the instructions and generates bytecodes, which are system independent machine codes. A bytecode interpreter executes the bytecodes. The bytecode interpreter can execute standalone, or in the case of applets, the bytecode interpreter is built-in Java compatible browsers. Thus, with a Java compatible client-server, the Internet is transformed from a passive giant book of information into an active network capable of supporting electronic commerce and virtual ecosystems. The portable computer system 600 allows users to move about freely within and between cells while transparently maintaining all connections, particularly with the Internet.

Although specific embodiments of the present invention have been illustrated in the accompanying drawings and described in the foregoing detailed description, it will be understood that the invention is not limited to the particular embodiments described herein, but is capable of numerous rearrangements, modifications, and substitutions without departing from the scope of the invention. The following claims are intended to encompass all such modifications.

Element Number List
100 wireless communication device
105 transceiver
110 cellular radio core
130 short-range wireless transceiver core
132 radio frequency (RF) modem core
134 link controller core
140 reconfigurable antenna
145 switch
150 processor core
151 central processor unit (CPU)
153 digital signal processor (DSP)
155 Application Specific Integrated Circuit (ASIC)
160 analog circuit
170 memory system
180 router
190 receiver switch
192 transmission switch
194 low-loss switch
196 low-loss switch
210 transmission line
215 first substrate
220 second substrate
221 main antenna body
222 secondary antenna body
223 secondary antenna body
224 secondary antenna body
225 secondary antenna body
226 secondary antenna body
230 ground plane
232 aperture
241 low-loss switch
242 low-loss switch
243 low-loss switch
244 low-loss switch
245 low-loss switch
251 frequency matching stub
252 frequency matching stub
253 frequency matching stub
254 frequency matching stub
255 frequency matching stub
256 frequency matching stub
260 stub junction
280 configurable filter
282 filter stub
284 filter stub
286 filter stub
292 low-loss switch
294 low-loss switch
296 low-loss switch
298 low-loss switch
300 active antenna
310 electrode patch
320 electrode patch
330 low-loss switch
340 low-loss switch
360 narrow conductive lines
500 substrate
502 input line
504 output line
506 armature
508 substrate electrode
600 portable computer system
620 computer processor
621 read only memory (ROM)
622 random access memory (RAM)
624 keypad
625 real-time clock/timer
626 bus
628 charge couple device (CCD) sensor
633 stylus pen
634 digitizer
635 display
642 input/output ports (I/O)

What is claimed is:

1. A mobile station comprising:
a reconfigurable antenna to be dynamically configured to transmit and receive wireless signals at a plurality of frequencies, the reconfigurable antenna having a first substrate including a plurality of antenna bodies and a second substrate including a plurality of frequency matching stubs;
at least one wireless transceiver coupled to the reconfigurable antenna; and
a processor coupled to the reconfigurable antenna and the at least one wireless transceiver, the processor to dynamically control configuration of the reconfigurable antenna and processing of the wireless signals.

2. The mobile station of claim 1, wherein the reconfigurable antenna is dynamically configurable via control of a plurality of switches, each coupled between two of the plurality of the antenna bodies.

3. The mobile station of claim 2, wherein the plurality of switches include micro-electro-mechanical (MEM) switches or semiconductor switches.

4. The mobile station of claim 1, further comprising a third substrate located between the first substrate and the second substrate, the third substrate having an aperture to couple the first substrate and the second substrate.

5. The mobile station of claim 4, wherein the aperture is sizdd to be half of a largest frequency of the wireless signals.

6. The mobile station of claim 4, wherein the third substrate comprises a ground plane.

7. The mobile station of claim 1, wherein the plurality of antenna bodies comprises a primary body and a plurality of secondary bodies.

8. The mobile station of claim 1, wherein the second substrate further comprises a transmission line coupled to the plurality of frequency matching stubs.

9. The mobile station of claim 8, wherein the plurality of frequency matching stubs are located radially about a stub junction.

10. The mobile station of claim 8, further comprising a configurable filter on the second substrate.

11. The mobile station of claim 10, wherein the configurable filter comprises a plurality of filter stubs extending from the transmission line.

12. The mobile station of claim 11, further comprising a plurality of switches, each controllable to couple a corresponding filter stub to the transmission line.

13. The mobile station of claim 1, wherein the processor includes a controller to dynamically control configuration of the reconfigurable antenna to enable the reconfigurable antenna to transmit and receive the wireless signals at the plurality of frequencies.

14. A portable computer system comprising:
a processor;
a program storage device coupled to the processor;
a wireless communication device coupled to the processor including:

a first substrate including a plurality of antenna bodies to be controllably electrically connected or disconnected;

a second substrate including a transmission line and a plurality of passive antennas to resonate at fixed frequencies; and a ground plane located between the first and second substrates; and a computer readable code embodied in the program storage device and coupled to the wireless communication device to receive and transmit data via the wireless communication device.

15. The portable computer system of claim 14, wherein the second substrate further comprises a plurality of fdter stubs coupled to the transmission line.

16. The portable computer system of claim 15, further comprising a plurality of switches each controllable to couple to the corresponding filter stub to the transmission line.

* * * * *